United States Patent Office

3,296,199
Patented Jan. 3, 1967

3,296,199
METHOD FOR MAKING ORGANOSILICON POLYMERS
Robert A. Murphy, Burnt Hills, N.Y., assignor to General Electric Company, a corporation of New York
No Drawing. Filed Jan. 4, 1965, Ser. No. 423,311
9 Claims. (Cl. 260—46.5)

The present invention relates to a method of making mixtures of organosilicon materials having reactive functional groups which are useful for making organosilicon polymers and copolymers. More particularly, the present invention relates to the reaction between aminoxy containing organosilicon materials, and organosilicon materials having hydroxy radicals attached to silicon.

The present invention is based on the discovery that organosilicon polymers and copolymers can be made from a mixture of lower molecular weight organosilicon materials consisting essentially of (A) a diaminoxy organosilicon material having a structural unit of the formula (1)

and (B) a hydroxy orgnosilicon material consisting essentially of chemically combined units of the formula, (2)

where R is a member selected from monovalent hydrocarbon radicals, halogenated monovalent hydrocarbon radicals, alkoxy radicals and triorganosiloxy radicals, R' is a member selected from monovalent hydrocarbon radicals, halogenated monovalent hydrocarbon radicals and cyanoalkyl radicals, Y is selected from $-N(R'')_2$ and a monovalent heterocyclic amine, such as morpholine, piperidine, etc., joined to silicon by a silicon-oxygen-nitrogen linkage, where R'' is a monovalent hydrocarbon radical, and the remaining valences of the silicon atom of the structural unit of Formula 1 are satisfied by a member selected from oxygen, R radicals, —OY radicals, divalent hydrocarbon radicals and mixtures thereof. For example, a high molecular weight polydiorganosiloxane such as a polydimethylsiloxane can be made by mixing dimethyldi(N,N-diethylaminoxy)silane as the diaminoxy organosilicon material having the structural unit of Formula 1, and a low molecular weight silanol-terminated polydimethylsiloxane as the hydroxy organosilicon material.

Organosilicon materials having structural units of Formula 1 which can be employed in the practice of the invention, referred to hereinafter as either "diaminoxy silanes," or "diaminoxy-containing organosilicon materials," include diaminoxy silanes having the formula, (3)             $R_2Si[OY]_2$ diaminoxy organosilicon materials of the formula, (4)

where R, Y and R' are as defined above, and $a$ is an integer equal to 1 to 10, inclusive. In addition to the above diaminoxy-containing material, there also can be employed in the practice of the invention diaminoxy cyclopolysiloxanes containing two aminoxy organosiloxy units of the formula,

chemically combined with from 1 to 6 diorganosiloxy units of Formula 2. There also can be employed linear diaminoxy organopolysiloxanes containing two of the aforementioned aminoxy units chemically combined with from 1 to 18 units of Formula 2, and chain-stopped with triorganosiloxy units of the formula,

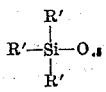

There are also included in the practice of the invention diaminoxy organosilicon materials of the formula, (5)
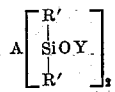

where R' is defined above, and A is selected from oxygen, R''' radicals and

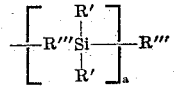

where $a$ is defined above, and R''' is a divalent hydrocarbon radical.

There is provided by the present invention, a method which comprises mixing together at a temperature between 0° C. to 200° C.

(A) A diaminoxy organosilicon material having the structural unit of Formula 1, and (B) a hydroxy organosilicon material selected from, (a) a silane of the formula, (6)
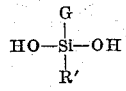

and (b) a silanol-terminated polydiorganosiloxane consisting essentially of chemically combined units of Formula 2, to provide for the production of an organosilicon polymer having a molecular weight greater than either (A) or (B) and a ratio of the sum of R radicals and a member selected from G radicals, and R' radicals to silicon of said organosilicon polymer of from about 1.95 to 2, where R and R' are defined above, and G is selected from monovalent aryl radicals and halogenated monovalent aryl radicals.

R of the above formulae include radicals such as aryl, halogenated aryl, e.g. phenyl, naphthyl, chlorophenyl, etc.; aralkyl radicals, e.g. phenylethyl, benzyl, etc.; aliphatic, e.g., methyl, ethyl, vinyl, propyl, allyl, chloropropyl, trifluoroethyl; alkoxy radicals such as methoxy, ethoxy, propoxy, etc.; triorganosiloxy, e.g. trimethylsiloxy, dimethylphenylsiloxy, etc. R' includes all of the aforementioned monovalent hydrocarbon and halogenated hydrocarbon radicals as well as cyanoethyl, cyanopropyl, etc. Radicals included by R″ are all of the above monovalent hydrocarbon radicals of R. A includes phenylene, naphthylene, silmethylene, silphenylene, etc. G includes all of the above monovalent aryl radicals and halogenated monovalent aryl radicals. In the above formulae where the aforementioned radicals such as R, R′, R″, R‴, A, and G respectively can represent more than one radical, these radicals can be all the same or they can be different.

Diaminoxy silanes included by Formula 3 are for example, $$(CH_3)_2Si[ON(CH_2CH_3)_2]_2$$
$$(C_6H_5)_2Si[ON(CH_3)(C_2H_5)]_2$$
$$(CH_3CH_2O)_2Si[ON(CH_2CH_3)_2]$$
$$[(CH_3)_3SiO]_2Si[ON(CH_2CH_3)_2]_2$$

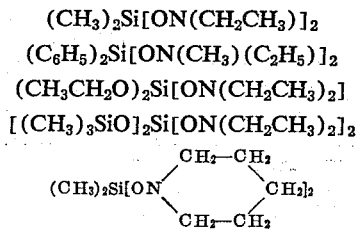

Diaminoxy organosilicon materials included by Formulae 4 and 5, as well as the above-described diaminoxy cyclopolysiloxanes, and linear diaminoxyorganopolysiloxanes are for example,

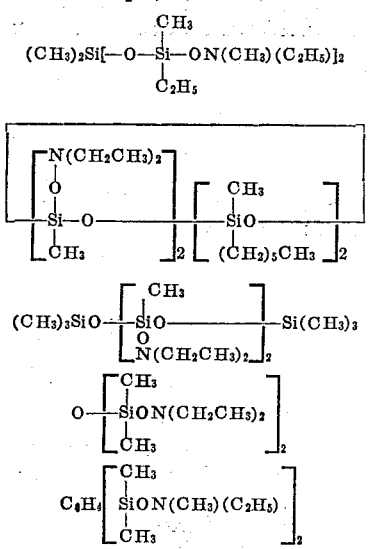

Included by the hydroxy-terminated organosilicon materials having units of Formula 2 that can be employed in the practice of the invention are silanol-terminated polydiorganosiloxane having from 1 to 3,000 chemically combined diorganosiloxy units and preferably from 100 to 1,500 units, such as dimethylsiloxy, silanol-terminated polydiphenylsiloxane, silanol-terminated polydiorganosiloxane consisting essentially of $$\begin{matrix} CH_3 \\ | \\ SiO \\ | \\ C_6H_5 \end{matrix}$$

units,

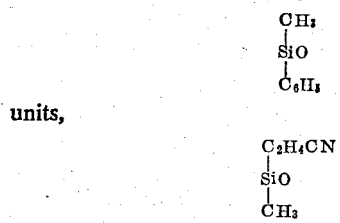

units, etc. The hydroxy terminated organosilicon materials also can contain a minor amount of organosiloxane units such as $CH_3SiO_{1.5}$, $C_6H_5SiO_{1.5}$, etc. Silanes included by Formula 6 are for example, diphenylsilanediol, methylphenylsilanediol, β-cyanoethylphenylsilanediol, etc.

Methods for making the above-described diaminoxy organosilicon materials are shown in my copending application Serial No. 423,354 assigned to the same assignee as the present invention. Among the reactions which can be employed for example, are reactions between organosilicon materials having silicon hydride units and a hydroxyl amine shown by the following equation, (7)  $\equiv SiH + HOY \rightarrow \equiv SiOY + H_2$ where Y is as defined above. Another method that can be employed involves the reaction in the presence of an acid acceptor between a halosilane in place of the silicon hydride and the hydroxyl amine. Aminoxy-terminated polydiorganosiloxane polymers having viscosities of up to 300,000 centipoises at 25° C. also can be employed in the practice of the invention in combination with organosilicon materials of Formula 2 to make higher molecular weight organosilicon polymers. These aminoxy-terminated organosilicon materials can be produced by mixing together any of the diaminoxy organosilicon silanes or diaminoxy organosilicon materials described above with a silanol-terminated polydiorganosiloxane in which the amount of diaminoxy silicon material utilized is sufficient to provide for an excess of aminoxy radicals over hydroxy radicals attached to silicon.

Methods for preparing the hydroxy organosilicon materials with Formula 2 units are well known to those skilled in the art. For example, a cyclic polydiorganosiloxane such as octamethylcyclotetrasiloxane can be equilibrated by use of an equilibration catalyst, such as potassium hydroxide, and controlled amounts of water can be added to the resulting high molecular weight polydiorganosiloxane to achieve the desired viscosity, such as from 500 centipoises to $10^8$ centipoises at 25° C.

Contact between the hydroxy organosilicon material and the diaminoxy organosilicon material results in the formation of siloxane linkages.

(8) 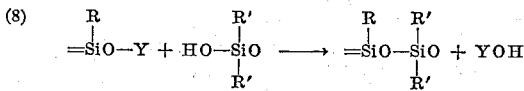

For example, organosilicon polymers which can be made in the practice of the invention include for example,

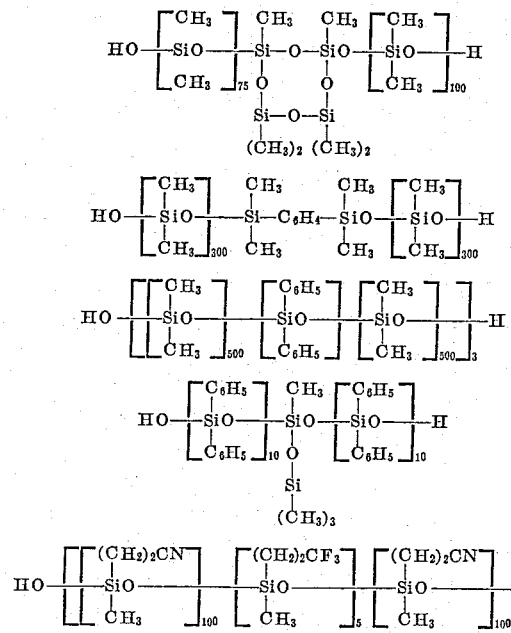

The process of the present invention can be practiced by mixing the diaminoxyorganosilicon material with the hydroxy organosilicon material at a temperature between 0° C. to 200° C.

The order of addition of the respective reactants is not critical. It has been found expedient to practice the method of the invention under substantially anhydrous conditions to preclude any undue hydrolysis of —OY radicals of the diaminoxy organosilicon material before it has an opportunity to react with the hydroxy organosilicon material. The employment of an organic solvent can in most instances be avoided. In particular instances however, especially where the diaminoxy organosilicon material is solid, any substantially anhydrous inert organic solvent can be utilized to facilitate the reaction. For example, solvents such as aromatic hydrocarbon solvents, for example, benzene, xylene, toluene, and the like can be employed.

The ratio of reactants is not critical. However, it is preferred to employ substantially stoichiometric equivalents of diaminoxy organosilicon material and the hydroxy organosilicon material based on the number of available aminoxy radicals attached to silicon and hydroxy radicals attached to silicon in the mixture. In instances where the presence of the diaminoxyorganosilicon material is less than stoichiometric, there generally remains unreacted hydroxy organosilicon material after the completion of the reaction. An excess of the diaminoxy organosilicon material will serve to chain-stop the hydroxy organosilicon material with aminoxy radicals. Further reaction is therefore precluded until the aminoxy radicals are hydrolyzed from silicon to provide for reactive hydroxy silicon sites.

Depending upon the temperature utilized, the ratio of reactants and the particular reaction employed, reaction periods of as little as 1 hour or less to 24 hours or more are not unusual.

The reaction is generally most conveniently performed under atmospheric conditions, however, pressure above or below atmospheric can be utilized. Recovery of the desired polymer can be readily achieved by allowing the mixture to achieve a maximum viscosity and then removing unreacted material under reduced pressure.

In order that those skilled in the art will be better able to practice the invention, the following examples are given by way of illustration and not by way of limitation. All parts are by weight.

EXAMPLE 1

One hundred parts of a silanol-terminated polydimethylsiloxane having a viscosity of about 2,800 centipoises at 25° C. was mixed with 1.9 parts of diphenyldi-(N,N-diethylaminoxy)silane. After 24 hours at 25° C. in a substantially moisture free atmosphere, the resulting mixture polymerized to a high molecular weight gum having a viscosity of about 4,300,000 centipoises at 25° C. Based on method of preparation, the gum was a polymer having the average formula, $$HO-\left[\left[\begin{array}{c}CH_3\\|\\SiO-\\|\\CH_3\end{array}\right]_{500}\left[\begin{array}{c}C_6H_5\\|\\SiO-\\|\\C_6H_5\end{array}\right]\left[\begin{array}{c}CH_3\\|\\SiO-\\|\\CH_3\end{array}\right]_{500}\right]_{3.3}-H$$

EXAMPLE 2

A mixture was prepared consisting of the silanol-stopped polydimethylsiloxane of Example 1, and a diaminoxyorganosilicon material. The moles of aminoxy attached to silicon of the diaminoxyorganosilicon material was substantially equal to moles of hydroxy radicals attached to silicon of the polydimethylsiloxane in the resulting mixture. The mixture was heated under substantially anhydrous conditions for about 18 hours at a temperature of 75° C. Other mixtures were prepared following the same procedure consisting of the same silanol-stopped polydimethylsiloxane having an initial viscosity at 25° C. of 2,800 centipoises with other diaminoxy organosilicon materials. Table I below shows the results obtained with the various mixtures. A temperature of 75° C. was maintained during the reaction. The reaction time as well as the final viscosities of the resulting polydimethylsiloxane polymers at 25° C. are also shown.

Table I

| Diaminoxy Organosilicon Material | Reaction Time (hrs.) | Centipoises, 25° C. |
|---|---|---|
| $(C_2H_5)_2NO-\underset{\underset{CH_3}{\mid}}{\overset{\overset{CH_3}{\mid}}{Si}}-ON(C_2H_5)_2$ | 18.75 | 1.976×10⁶ |
| $\left[(C_2H_5)NO-\underset{\underset{CH_3}{\mid}}{\overset{\overset{CH_3}{\mid}}{Si}}-O\right]_2$ | 18.75 | 3.470×10⁶ |
| $(CH_3)_3SiO-\left[\underset{\underset{ON(C_2H_5)_2}{\mid}}{\overset{\overset{CH_3}{\mid}}{Si}O}-\right]_2-Si(CH_3)_3$ | 16.50 | 32×10⁴ |

EXAMPLE 3

One hundred parts of a silanol-terminated polydimethylsiloxane having a viscosity of about 700 centipoises at 25° C. were mixed with 3 parts of 1,5-di(N,N-diethylaminoxy)-1,1,3,3,5,5-hexamethyltrisiloxane. The resulting mixture was allowed to stand for 25 hours at 25° C. There was obtained a polymer having a viscosity of about 22,800 centipoises at 25° C. Based on method of preparation and the materials utilized, the polymer had the average formula,

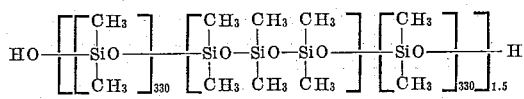

EXAMPLE 4

Two hundred parts of a silanol-terminated polydimethylsiloxane having a viscosity of 2,800 centipoises at 25° C. were mixed with 6 parts of di-(N,N-diethylaminoxy)-dipentyl-1,3,5,7-tetramethylcyclotetrasiloxane under substantially anhydrous conditions. The resulting mixture was allowed to stand for 22 hours at 25° C. There was obtained a high molecular weight gum having a viscosity of about 2½ million cenpoises at 25° C. Based on method of preparation and the materials utilized, the gum had the average formula,

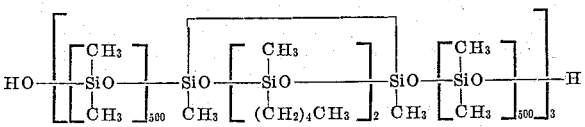

EXAMPLE 5

There was mixed 0.5 part of diphenylsilanediol with 100 parts of a polydimethylsiloxane having a viscosity of about 54,800 centipoises at 25° C. and chain-stopped with dimethyl(N,N-diethylaminoxy)silyl units. The mixture was roller mixed for 96 hours under substantially anhydrous conditions at 25° C. There was obtained a polymer having a viscosity of 232,000 centipoises at 25° C.

While the foregoing examples have of necessity been limited to only a few of the very many variables within the scope of the present invention, it should be understood that the present invention is directed to a method for making a much broader class of polymers and copolymers by reacting a diaminoxyorganosilicon material having units of Formula 1 with a hydroxy organosilicon material consisting essentially of chemically combined units of Formula 2.

What I claim as new and desire to secure by Letters Patent of the United States is:

1. A method which comprises (1) mixing under substantially anhydrous conditions at a temperature between 0° C. to 200° C., (A) an aminoxy organosilicon material having two OY radicals attached to silicon by silicon-oxygen-nitrogen bonds and selected from the class consisting of a silane, a linear polysiloxane, a cyclopolysiloxane, and a bis(silyl)hydrocarbon, and (B) a hydroxy organosilicon material selected from the class consisting of (a) a silane of the formula,

and (b) a silanol-terminated polydiorganosiloxane consisting essentially of chemically combined units of the formula,

and (2) recovering from (1), an organosilicon polymer having a molecular weight greater than (A) or (B) and a ratio of from about 1.95 to 2 monovalent radicals per silicon atom selected from the class consisting of hydrocarbon radicals, halogenated hydrocarbon radicals, alkoxy radicals, triorganosiloxy radicals and cyanoalkyl radicals, where R' is a member selected from the class consisting of monovalent hydrocarbon radicals, halogenated monovalent hydrocarbon radicals, and cyanoalkyl radicals, G is a monovalent aryl radical, Y is a member selected from the class consisting of —N(R")$_2$ and a monovalent heterocyclic amine, and R" is a monovalent hydrocarbon radical.

2. The method in accordance with claim 1, where the diaminoxyorganosilicon material is a diaminoxy silane having the formula:

where R is a member selected from the class consisting of monovalent hydrocarbon radicals, halogenated monovalent hydrocarbon radicals, alkoxy radicals, and triorganosiloxy radicals, Y is a member selected from the class consisting of —N(R")$_2$ and a monovalent heterocyclic amine joined to silicon of said diaminoxyorganosilicon material by a silicon-oxygen-nitrogen linkage, and R" is a monovalent hydrocarbon radical.

3. The method of claim 1 where the hydroxy organosilicon material is a silanol-terminated polydiorganosiloxane consisting essentially of chemically combined units of the formula,

where R' is a member selected from the class consisting of monovalent hydrocarbon radicals, halogenated monovalent hydrocarbon radicals, and cyanoalkyl radicals.

4. The method in accordance with claim 1 where the diaminoxyorganosilicon material has the formula,

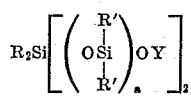

where R is a member selected from the class consisting of monovalent hydrocarbon radicals, alkoxy radicals, and triorganosiloxy radicals, R' is a member selected from the class consisting of monovalent hydrocarbon radicals, halogenated monovalent hydrocarbon radicals, and cyanoalkyl radicals, and Y is a member selected from the class consisting of —N(R")$_2$, and a monovalent heterocyclic amine joined to silicon of said diaminoxyorganosilicon material by a silicon-oxygen-nitrogen linkage, R" is a monovalent hydrocarbon radical, and $a$ is an integer equal to from 1 to 10, inclusive.

5. A method in accordance with claim 1 where the diaminoxyorganosilicon material is a diaminoxy cyclopolysiloxane consisting of two aminoxy organosiloxy units of the formula,

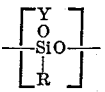

chemically combined with from 1 to 6 diorganosiloxy units of the formula,

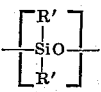

where R is a member selected from the class consisting of monovalent hydrocarbon radicals, alkoxy radicals, and triorganosiloxy radicals, R' is a member selected from the class consisting of monovalent hydrocarbon radicals, halogenated monovalent hydrocarbon radicals, and cyanoalkyl radicals, Y is a member selected from the class consisting of —N(R")$_2$ and a monovalent heterocyclic amine joined to silicon by silicon-oxygen-nitrogen linkages, and R" is a monovalent hydrocarbon radical.

6. A method which comprises (1) mixing together at a temperature between 0° C. to 200° C., (A) a diaminoxyorganosilicon material having at least 2 aminoxy radicals of the formula,

chemically combined with diorganosiloxy units of the formula,

and chain-stopped with triorganosiloxy units of the formula,

and (B) a silanol-terminated polydiorganosiloxane consisting essentially of said diorganosiloxy units, and (2) recovering from (1), an organopolysiloxane polymer having a molecular weight greater than either (A) or (B), and a ratio of the sum of R radicals and R' radicals to silicon, of from about 1.95 to 2, where R is a member selected from the class consisting of monovalent hydrocarbon radicals, halogenated monovalent hydrocarbon radicals, alkoxy radicals, and triorganosiloxy radicals, R' is a member selected from the class consisting of monovalent hydrocarbon radicals, halogenated monovalent hydrocarbon radicals and cyanoalkyl radicals, Y is a monovalent amine radical selected from the class consisting of —N(R")$_2$ and a heterocyclic amine joined to silicon by silicon-oxygen-nitrogen linkages, and R" is a monovalent hydrocarbon radical.

7. A method which comprises (1) mixing together at a temperature between 0° C. to 200° C., (A) diphenyl-di(N,N-diethylaminoxy)silane and a silanol-terminated polydimethylsiloxane, and (2) recovering from (1) a polydiorganosiloxane consisting essentially of chemically combined polydimethylsiloxy units, and diphenylsiloxy units, and having a molecular weight higher than said polydimethylsiloxane.

8. A method which comprises (1) mixing together at a temperature between 0° C. to 200° C., diphenylsilanediol and a polydimethylsiloxane chain-stopped with dimethyl-(N,N-diethylamino)silyl units, and (2) recovering from (1), a polydimethylsiloxane having a molecular weight greater than said polydimethylsiloxane of (1).

9. A method which comprises (1) mixing together at a temperature between 0° C. to 200° C., di(N,N-diethylaminoxy)dipentyl - 1,3,5,7-tetramethylcyclotetrasiloxane and a silanol-terminated polydimethylsiloxane, and (2) recovering from (1) an organopolysiloxane polymer consisting essentially of chemically combined dimethylsiloxy units having a molecular weight greater than said silanol-terminated polydimethylsiloxane of (1).

References Cited by the Examiner

UNITED STATES PATENTS

| 2,955,127 | 10/1960 | Pike | 260—448.2 |
| 3,105,061 | 9/1963 | Bruner | 260—46.5 |
| 3,133,110 | 5/1964 | Morehouse et al. | 260—448.2 |

LEON J. BERCOVITZ, *Primary Examiner.*

M. I. MARQUIS, *Assistant Examiner.*